United States Patent
Cheung et al.

(10) Patent No.: US 11,145,501 B2
(45) Date of Patent: Oct. 12, 2021

(54) THERMAL MANAGEMENT FOR INSTRUMENTS INCLUDING A PLASMA SOURCE

(71) Applicant: PerkinElmer, Inc., Waltham, MA (US)

(72) Inventors: Tak Shun Cheung, Scarborough (CA); Chui Ha Cindy Wong, Markham (CA); Andrew Icasiano, Brampton (CA); Brian Chan, Markham (CA)

(73) Assignee: PerkinElmer, Inc., Waltham, MA (US)

(*) Notice: Subject to any disclaimer, the term of this patent is extended or adjusted under 35 U.S.C. 154(b) by 0 days.

(21) Appl. No.: 16/795,833

(22) Filed: Feb. 20, 2020

(65) Prior Publication Data

US 2021/0265153 A1   Aug. 26, 2021

(51) Int. Cl.
*H01J 49/10* (2006.01)
*F16L 59/02* (2006.01)
*G01N 21/71* (2006.01)

(52) U.S. Cl.
CPC ............ *H01J 49/105* (2013.01); *F16L 59/02* (2013.01); *G01N 21/71* (2013.01)

(58) Field of Classification Search
CPC ......... G01J 3/443; G01N 21/73; G01N 21/67; G01N 21/71; H01J 49/105; H01J 49/26; F16L 59/02; H01G 49/06; H01G 49/10
See application file for complete search history.

(56) References Cited

U.S. PATENT DOCUMENTS

| | | | |
|---|---|---|---|
| 4,804,838 A * | 2/1989 | Miseki | H01J 49/105 250/281 |
| 5,086,255 A * | 2/1992 | Okamoto | H05H 1/46 250/288 |
| 5,841,531 A | 11/1998 | Gliddon | |
| 9,956,609 B1 * | 5/2018 | De Saro | C22C 1/02 |
| 2005/0213079 A1 * | 9/2005 | Fink | G01N 21/73 356/72 |
| 2007/0000843 A1 | 1/2007 | Kimball et al. | |
| 2014/0339418 A1 * | 11/2014 | Makarov | H01J 49/067 250/282 |
| 2016/0104606 A1 | 4/2016 | Park et al. | |
| 2016/0270201 A1 * | 9/2016 | Nakagawa | H05H 1/30 |
| 2020/0194247 A1 * | 6/2020 | Hinrichs | H01J 49/067 |

OTHER PUBLICATIONS

International Search Report and Written Opinion dated May 26, 2021 in connection with International Application No. PCT/US2021/018574.

* cited by examiner

*Primary Examiner* — Dominic J Bologna
(74) *Attorney, Agent, or Firm* — Wolf, Greenfield & Sacks, P.C.

(57) ABSTRACT

Thermal management arrangements for analysis systems including a plasma source such as inductively-coupled-plasma are disclosed. An analysis system may include a plasma source configured to a plasma source configured to receive and ionize a sample to create an ionized sample, and an instrument such as a mass spectrometer or optical emission spectrometer configured to receive and analyze the ionized sample. A heat shield may be positioned between the plasma source and the instrument, and the heat shield may be constructed and arranged to direct heated gas and/or plasma from the plasma source away from the instrument. In some instances, the heated gas and/or plasma may be extracted from a chamber containing the plasma source.

20 Claims, 6 Drawing Sheets

THERMAL MANAGEMENT FOR INSTRUMENTS INCLUDING A PLASMA SOURCE

FIELD

Disclosed embodiments are related to arrangements for providing thermal management in instruments that include a plasma source, such as mass spectrometers or optical emission spectrometers.

BACKGROUND

Various analysis systems, such as mass spectrometry systems or optical emission spectrometry systems are used to perform compositional analyses on chemical samples. Many analysis systems utilize a plasma source (such as an inductively coupled plasma source) to generate an ionized sample that may be analyzed by the system. For example, a chemical sample may be introduced into the plasma source and passed through the plasma, and the high heat associated with the plasma may ionize the chemical sample. The ionized sample may be received into an analysis instrument for subsequent analysis.

SUMMARY

According to some aspects of the present disclosure, analysis systems are disclosed. In one embodiment, an analysis system comprises a plasma source configured to receive and ionize a sample to create an ionized sample, an instrument configured to receive the ionized sample to be analyzed, and a heat shield positioned between the plasma source and the instrument. The heat shield is constructed and arranged to direct heated gas and/or plasma from the plasma source away from the instrument.

In various embodiments of the analysis system, the plasma source is an inductively coupled plasma source. In some embodiments, the instrument comprises a mass spectrometer or an optical emission spectrometer.

In various embodiments of the analysis system, the heat shield comprises an aperture sized and shaped to permit the ionized sample to pass through the heat shield to the instrument.

In various embodiments of the analysis system, the instrument comprises a sampling aperture constructed and arranged to receive the ionized sample. In some embodiments, the aperture of the heat shield is larger than the sampling aperture. In some embodiments, a radial spacing between an edge of the aperture of the heat shield and an edge of the sampling aperture is between about 10 mm and about 30 mm. For example, in one embodiment, the radial spacing is about 23.5 mm.

In various embodiments of the analysis system, the sampling aperture is formed on a sampling cone of the instrument. In some embodiments, the heat shield is formed as a coating layer on at least a portion of the sampling cone. In further embodiments, the heat shield is mechanically coupled to the sampling cone. In some embodiments, the heat shield is spaced from the sampling cone.

In various embodiments of the analysis system, the heat shield comprises a first heat shield portion and a second heat shield portion, and the first heat shield portion is positioned closer to the sampling aperture than the second heat shield portion. In some embodiments, the first and second heat shield portions are formed from different materials.

In various embodiments of the analysis system, the heat shield has a non-uniform thickness. For example, in some embodiments, a thickness of the heat shield at a first radial position adjacent the aperture is smaller than a thickness of the heat the heat shield at a second radial position spaced from the aperture.

In various embodiments of the analysis system, the heat shield comprises a first heat shield layer and a second heat shield layer spaced from the first heat shield layer. In some embodiments, a gap between the first and second heat shield layers defines a conduit through which the heated gas and/or plasma is extracted. In some embodiments, the conduit is coupled to a pump configured to extract the heated gas and/or plasma.

In various embodiments of the analysis system, the heat shield comprises a ceramic material, a metallic material, a silicon-based material, and/or a carbon-based material. In some embodiments, the heat shield comprises a ceramic material, and the ceramic material is at least one selected from the group consisting of an oxide, a carbide, and a nitride. For example, in some embodiments, the ceramic material comprises aluminum oxide, macor, mullite, aluminum nitride, hafnium carbide, tantalum carbide, niobium carbide, zirconium carbide, hafnium nitride, hafnium boride, zirconium boride, titanium boride, titanium carbide, niobium boride, tantalum boride, titanium nitride, zirconium nitride, silicon carbide, vanadium carbide, tantalum nitride, niobium nitride, and/or vanadium nitride.

In various embodiments of the analysis system, a thickness of the heat shield is between about 2 mm and about 4 mm.

In some embodiments, a radial spacing between an edge of the aperture of the heat shield and an edge of the sampling aperture is between about 10 mm and about 30 mm.

In some embodiments, the radial spacing is about 23.5 mm.

In some embodiments, the heat shield is spaced from the sampling cone.

In some embodiments, a maximum operating temperature of the one or more insulating members is lower than a maximum operating temperature of the heat shield.

In various embodiments, the analysis system further comprises one or more insulating members positioned around at least a portion of a perimeter of a chamber in which the plasma source is positioned. In some embodiments, the one or more insulating members are positioned at an interface between the plasma source and the instrument. For example, in some embodiments, the portion of the perimeter of the chamber defines a sidewall of the chamber. Further, in some embodiments, a material of the one or more insulating members is different than a material of the heat shield. In some embodiments, a maximum operating temperature of the one or more insulating members is lower than a maximum operating temperature of the heat shield layer. In some embodiments, the one or more insulating members comprise a fiberglass layer. Moreover, in some embodiments, the one or more insulating members are arranged to cover at least 75% of an interior surface of the chamber.

In various embodiments, the analysis system further comprises a pump coupled to a chamber in which the plasma source is positioned, and the pump is configured to extract at least a portion of the heated gas and/or plasma from the chamber.

According to another aspect of the present disclosure, methods for cooling an analysis system are provided. In one embodiment, a method of cooling an analysis system comprises directing heated gas and/or plasma away from an instrument with a heat shield positioned in a chamber between a plasma source and the instrument, and extracting at least a portion of the heated gas and/or plasma from the chamber.

In various embodiments of the method, the heat shield comprises a first heat shield layer and second heat shield layer spaced from the first heat shield layer, and the heated gas and/or plasma is extracted through a gap between the first and second heat shield layers.

In various embodiments of the method the heated gas and/or plasma is extracted via a pump associated with the analysis system.

In various embodiments, the method further comprises receiving an ionized sample through a sampling aperture of the instrument. In some embodiments, the method further comprises passing the ionized sample through an aperture of the heat shield prior to receiving the sample through the sampling aperture. In some embodiments of the method, the aperture of the heat shield is larger than the sampling aperture. Further, in some embodiments, the sampling aperture is formed on a sampling cone of the instrument. For example, in some embodiments, the wherein the heat shield is formed as a coating layer on the sampling cone. In other embodiments, the heat shield is mechanically coupled to the sampling cone. Moreover, in some embodiments, the heat shield is spaced from the sampling cone.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Analysis systems such as mass spectrometry or optical emission spectroscopy systems may include a plasma source, such as an inductively coupled plasma (ICP) torch, as a means for ionizing chemical samples. For example, in ICP mass spectrometers (ICP-MS) or ICP optical emission spectrometers (ICP-OES), an ICP torch may be operated at power levels on the order of kilowatts to generate a plasma having a temperature of thousands of degrees Kelvin (e.g., about 5000 K). A sample may be introduced into the plasma to generate an ionized sample, which may be directed into and subsequently analyzed by the mass spectrometer. However, in such systems, heat from the plasma source may undesirably be transmitted into the instrument. For example, upon contact between plasma and/or heated gas from the plasma source and components of the instrument (e.g., metallic components or other components having relatively high thermal conductivity), heat from the plasma and/or heated gas may be absorbed and dissipated into the instrument. In existing systems, this heat is typically mitigated via cooling arrangements such as cooling channels or heat pipes through which chilled cooling fluid is flowed, and/or other active or passive cooling structures configured to extract heat from the instrument. However, the inventors have appreciated that such cooling arrangements often add complexity, size, and/or cost to the analysis system.

In view of the foregoing, the inventors have recognized and appreciated numerous benefits associated with thermal management arrangements for analysis systems including a plasma source (e.g., ICP-MS systems, ICP-OES systems, etc.) that may significantly reduce an amount of heat that reaches an instrument (e.g., an analysis instrument) of the system. For example, the thermal management arrangements described herein may allow for heat associated with a plasma source to be extracted from the system while the heat is associated with a gaseous form (e.g., while in a plasma and/or heated gas state). The inventors have appreciated that extracting the heat in this manner may be substantially more efficient than extracting the heat after it is absorbed by and dissipated through an instrument, which may require relying on thermal conduction and/or heat transfer through solid interfaces. Accordingly, in some instances, the thermal management arrangements described herein may allow for analysis systems that do not require any of the above-described cooling structures (or require fewer and/or simpler cooling structures), thereby allowing for simpler and/or more cost-effective design of an analysis system. For example, the presently disclosed thermal management arrangements may allow for reduced cooling requirements, reduced electricity usage, reduction or elimination of chiller hardware, and/or smaller overall system size compared to existing systems.

According to some aspects, a thermal management arrangement may include a heat shield constructed and arranged to reduce an amount of heat transmitted from a plasma source (e.g., an ICP torch) to an instrument (e.g., an MS or OES instrument). The plasma source may be configured to ionize a sample introduce into the plasma source to generate an ionized sample which may be received and subsequently analyzed by the instrument. The heat shield may be formed from one or more heat resistant and/or thermally insulating materials and the heat shield may be positioned between the plasma source and the instrument. In this manner, the heat shield may be constructed and arranged to block the transfer of heat from the plasma source to the instrument, for example, by directing heated gas and/or plasma generated by the plasma source away from the instrument.

In some embodiments, a heat shield may include an orifice configured to permit transmission of an ionized sample into an instrument. For example, an MS or OES system may include a sampling aperture formed on a sampling cone and arranged to receive an ionized sample, and the aperture of the heat shield may overlie the sampling aperture. In this manner, a small portion of the plasma containing the ionized sample may pass through the aperture and be received into the sampling aperture for subsequent analysis by the instrument, while the remainder of the plasma and/or heated gas may be directed away from the instrument. In some embodiments, the aperture of the heat shield may be larger than the sampling aperture. For example, a center of the heat shield aperture may be substantially aligned with a center of the sampling aperture, and a perimeter of the heat shield aperture may be radially spaced from a perimeter of the sampling aperture. In some instances, such arrangements may aid in avoiding exposure of the heat shield to the hottest portions of the plasma (which may be present at a central portion of the plasma), thus avoiding and/or reducing damage to the heat shield. In some embodiments, a radial spacing between the heat shield aperture and the sampling aperture may be between about 10 mm and about 30 mm. In one example embodiment, the sampling aperture may have a diameter of about 3 mm and the heat shield aperture may have a diameter of about 53 mm such that a radial spacing between the sampling aperture and the heat shield aperture is about 23.5 mm. However, it should be appreciated that other spacings and/or dimensions for the apertures may be suitable in some instances, as the current disclosure is not limited in this regard.

Moreover, in some embodiments, an aperture of a heat shield may have a diameter that is larger than a diameter of a sampling cone in which a sampling aperture is formed. For example, the diameter of the heat shield aperture may be at least about 5 mm larger than a diameter of the sampling cone. The inventors have appreciated that such arrangements may be beneficial in allowing the sampling cone to be removed from the instrument without requiring removal of the heat shield. However, it should be appreciated that other arrangements also may be suitable, such as arrangements in which the aperture of the heat shield is smaller than a diameter of the sampling cone and the heat shield at least partially overlies the sampling cone.

In some embodiments, a heat shield may be a separate member that is placed adjacent an interface between a plasma source and an instrument, such as a sampling cone of an MS or OES instrument. For example, the heat shield may be placed in contact with the interface or the heat shield may be closely spaced from the interface. In some instances, a small air gap (e.g., about 1 mm) between the heat shield and the interface may provide additional thermal insulation. In other embodiments, the heat shield may be formed as a coating layer on at least a portion of the interface. For example, at least a portion of a heat shield may be formed as a coating layer on a portion of a sampling cone. In further embodiments, the heat shield may be a separate member that is mechanically coupled to the heat shield. In each of these arrangements, the positioning of the heat shield adjacent the sampling cone may aid in avoiding a large gap between the heat shield and the interface which could lead to entrapment of heated gas and/or plasma against interface, thereby exacerbating the transfer of heat into the instrument.

Depending on the particular embodiment, a heat shield, whether formed as a coating layer on a sampling cone or other component of an instrument or provided as a separate member, may have a thickness suitable for the particular use. For example, in some embodiments, a thickness of the heat shield may be between about 0.5 mm and about 5 mm, between about 1 mm and about 4 mm, and/or between about 2 mm and about 3 mm. Moreover, in some embodiments, the heatshield may have a non-uniform thickness. For example, the inventors have appreciated that in some instances, a heat shield that is thinner near an aperture of the heat shield than near the outer perimeter may aid in promoting a desirable air flow within a chamber in which a plasma source is located, thereby allowing for more efficient extraction of heated gas and/or plasma from the chamber, as described below. Alternatively, in some embodiments, a heat shield that is thicker near an aperture of the heat shield than near the outer perimeter may provide additional shielding near the aperture where the hottest portions of the heated gas and/or plasma is likely to be. Accordingly, it should be appreciated that the current disclosure is not limited to heat shields having any particular thickness or combinations of thicknesses.

In some embodiments, a heat shield may be constructed a single monolithic component, while in other embodiments, the heat shield may have a modular construction comprise two or more separate components. For example, a first component may define a first portion of the heat shield closer to a sampling aperture of an instrument, while a second component may define a second portion of the heat shield that may be spaced further from the sampling aperture (e.g., along a radial direction). In some such embodiments, an aperture of the heat shield may be formed in the first portion of the heat shield. According to some aspects, at least a portion of a heat shield may be removable. For example, the first portion of the heat shield described above, which may be exposed to higher temperatures due to its position closer to the sampling aperture, may be removable to be replaced or repaired.

As noted above, a heat shield according to the current disclosure may be formed from one or more high temperature materials (i.e., materials that can withstand exposure to high temperatures without melting or otherwise substantially degrading). Additionally, the heat shield may be formed from thermally insulating material (i.e., a material having a low thermal conductivity) to aid in reducing transfer of heat from a plasma source to an instrument. In some embodiments, the heat shield may comprise one or more ceramic materials such as oxides, carbides, and/or nitrides. Suitable ceramic materials may include, but are not limited to, aluminum oxide, macor, mullite, aluminum nitride, hafnium carbide, tantalum carbide, niobium carbide, zirconium carbide, hafnium nitride, hafnium boride, zirconium boride, titanium boride, titanium carbide, niobium boride, tantalum boride, titanium nitride, zirconium nitride, silicon carbide, vanadium carbide, tantalum nitride, niobium nitride, and/or vanadium nitride. Other suitable materials may include, but are not limited to, metallic materials, silicon-based materials, and/or carbon-based materials. In some embodiments, a heat shield may comprise multiple materials having different thermal properties. For example, a heat shield may be configured to exhibit greater heat resistance (e.g., a greater thermal insulation and/or lower thermal conductivity) in portions of the heat shield closer to a sampling aperture. In view of the above, it should be appreciated that a heat shield as described herein may comprise any suitable combination of materials arranged in any suitable manner.

According to some aspects, the thermal management arrangements disclosed herein may allow for extraction of heated gas and/or plasma from a chamber in which a plasma source is located. As noted above, the inventors have appreciated that such arrangements may allow for more efficient extraction of heat from a system compared to existing arrangements in which heat is extracted from an instrument after it is dissipated into the instrument (e.g., via active or passive cooling structures associated with the instrument). For example, heated gas and/or plasma are highly mobile and may be directly extracted from the chamber to extract heat from the system. Accordingly, in some embodiments, a pump may be coupled to the chamber, and the pump may be configured to pump the heated gas and/or plasma out of the chamber, thereby reducing an amount of heated gas that ultimately reaches the instrument. In one embodiment, a method of operating such a system may include directing heated gas and/or plasma away from the instrument with the heat shield and extracting at least a portion of the heated gas and/or plasma from the chamber.

In some embodiments, a heat shield such as those described above may be constructed and arranged to define a conduit through which heated gas and/or plasma may be extracted. For example, the heat shield may comprise a first heat shield layer and a second heat shield layer spaced from the first layer, and a spacing between the two layers may define the conduit. It should be appreciated that the heat shield may have any suitable spacing between the first and second layers. For example, in some embodiments, the spacing may be between about 1 mm and about 5 mm.

In some instances, an analysis system may include one or more insulating members positioned around an interior of a chamber in which a plasma source is located. For example, such insulating members may be provided additionally to, or alternatively to a heat shield as discussed above positioned between the plasma source and an instrument. Without wishing to be bound by any particular theory, the insulating members may aid in avoiding heat transfer to the instrument, such as by reducing an amount of heat that is absorbed by walls of the chamber and subsequently transferred to the instrument (e.g., via thermal conduction or convection). In some embodiments that include both a heat shield and the one or more insulating members, a material of the insulating members may be selected to have relatively lower thermal performance compared to the material(s) of the heat shield. The inventors have appreciated that the insulating members, which may be positioned further from the plasma source than the heat shield, may not be exposed the high temperatures or heat levels that the heat shield may be exposed to, and thus it may be suitable to use a lower grade insulting material for the insulation members. For example, the one or more insulating members may be formed of materials having lower thermal insulation performance, lower maximum operating temperatures, and/or higher thermal conductivity relative to the material(s) of the heat shield. In some example embodiments, the insulating members may comprise one or more fiberglass layers. However, it should be appreciated that the current disclosure is not limited to embodiments in which the heat shield and insulating members are formed from different materials. For example, the heat shield and insulating members may be formed from the same materials. Moreover, it should be appreciated that the one or more insulating members may be provided in any suitable portion of the chamber. For example, the insulating members may be positioned to cover a perimeter of the chamber around the plasma source, to cover a substantial portion of the chamber, such as at least 75% of an interior surface of the chamber, or to cover any other suitable portion of the chamber, as the current disclosure is not limited in this regard.

While some embodiments described herein include a plasma source, it should be appreciated that the presently disclosed thermal management arrangements also may be used in systems that do not include a plasma source, such as systems that use non-plasma-based heat sources to treat a sample. Moreover, while in some instances the disclosed thermal management arrangements are used in connection with a spectrometry instruments such as a mass spectrometer or optical emission spectrometer, it should be understood that the current disclosure is not limited to any particular type of instrument or analysis system.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

Figure 1:
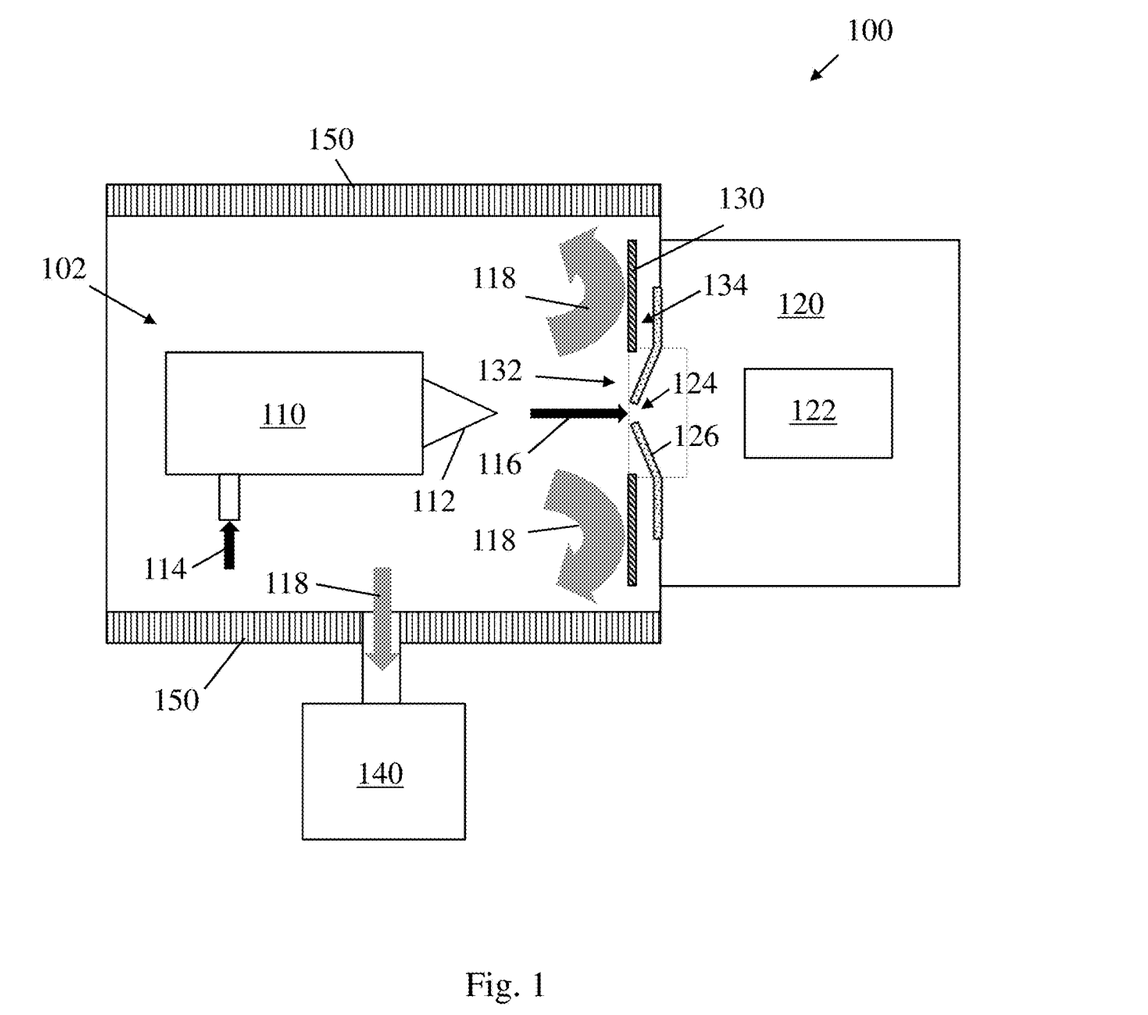
FIG. 1 is a schematic cross-sectional view of an analysis system, according to some embodiments.

FIG. 1 is a schematic cross-sectional side view of one embodiment of an analysis system 100 including a plasma source 110 (such as an ICP source) positioned within a chamber 102. The plasma source 110 may be configured to generate a plasma 112 to ionize a sample 114 introduced into the plasma source and form an ionized sample 116, which may be analyzed by an instrument 120, such as an MS or OES instrument. For example, the instrument 120 may include one or more sensors or sensor assemblies 122 constructed and arranged to analyze the ionized sample 116 received by the instrument 120. As illustrated, the instrument 120 may include a sampling aperture 124 at an interface between the chamber 102 and the instrument 120. In the depicted embodiment, the sampling aperture 124 is formed on a sampling cone 126 of the instrument 120, which may be radially symmetric about an axis passing through the sampling aperture. However, it should be appreciated that the current disclosure is not limited to any particular configuration for the sampling cone 126, or any other feature of the instrument 120 on which the sampling aperture 124 is formed. Moreover, the analysis system 100 may include additional components (not shown), such as a skimmer cone and a hyper skimmer cone between the sampling cone 126 and the one or more sensors or sensor assemblies 122.

The system 100 further includes a heat shield 130 positioned between the plasma source 110 and the instrument 120. As discussed previously, the heat shield 130 may be constructed and arranged to direct heated gas and/or plasma 118 generated by the plasma source 110 away from the instrument 120, thereby reducing an amount of heat that is absorbed by and/or dissipated into the instrument 120. The heat shield 130 may define an aperture 132 through which the ionized sample 116 may flow to the instrument 120. In the depicted embodiment, the heat shield 130 is spaced from the sampling cone 126 to define an air gap 134. As discussed above, in some instances, the air gap 134 may provide additional thermal insulation between the plasma source 110 and the instrument. However, in other embodiments, there may be no gap between the heat shield 130 and the sampling cone 126 (e.g., the heat shield and sampling cone may be in contact with one another. Moreover, similar to the sampling cone 126, the heat shield 130 may be radially symmetric about an axis passing through a center of the aperture 132 (e.g., the heat shield may be circular), though other arrangements may be suitable, as the disclosure is not limited in this regard.

The analysis system 100 of FIG. 1 further comprises a pump 140 associated with the chamber 102. In some instances, the pump 140 may be operated to extract heated gas and/or plasma 118 generated by the plasma source 110 from the chamber 102. As discussed previously, such arrangements may advantageously take advantage of the relatively high mobility of heat when it is associated with the heated gas and/or plasma to extract heat from the system 100 more efficiently compared to existing cooling arrangements that are configured to extract heat after it has been absorbed into and/or dissipated into the instrument 120. In some embodiments, the pump 140 may be configured to extract heated gas and/or plasma 118 from the chamber 102 after the heated gas and/or plasma 118 has been directed away from the instrument 120 by the heat shield 130.

As further illustrated in FIG. 1, the system 100 includes optional insulating members 150 positioned within the chamber 102. For example, the insulating members may be positioned around a perimeter of the chamber 102, which in some instances may define sidewalls of the chamber 102. Moreover, in some instances, one or more insulating members may be positioned at an interface between the chamber 102 and the instrument 120.

Figure 2:
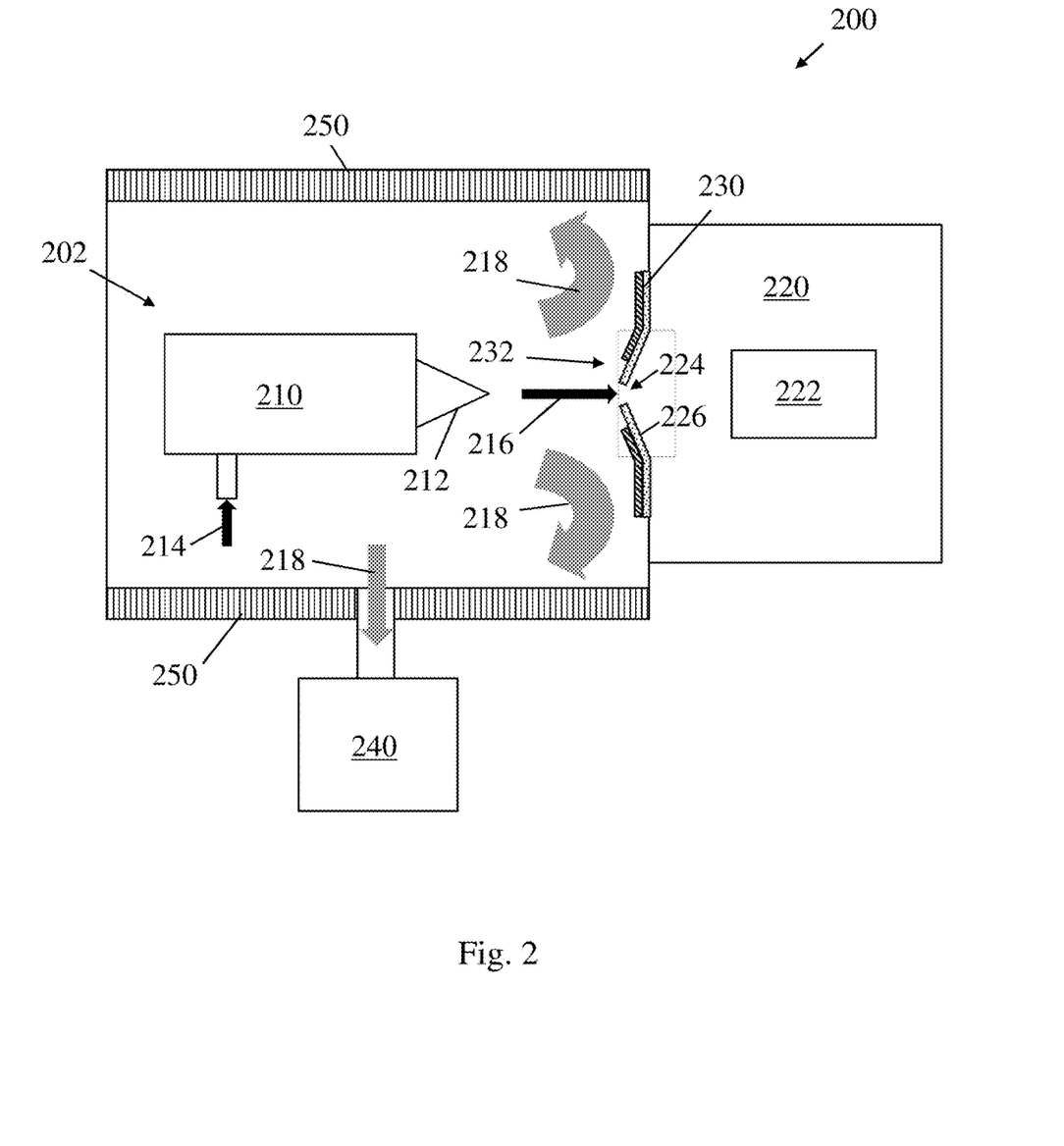
FIG. 2 is a schematic cross-sectional view of an analysis system, according to some embodiments.

Referring now to FIG. 2, another embodiment of an analysis system 200 is shown. Similar to the embodiment described above in connection with FIG. 1, the system 200 includes a plasma source 210 positioned within a chamber 202 to generate a plasma 212 to ionize a sample 214 introduced into the plasma source, thereby forming an ionized sample 216. The ionized sample 216 may be analyzed by an instrument 220, such as an MS or OES instrument, using one or more sensors or sensor assemblies 222 associated with the instrument. As illustrated, the instrument includes a sampling aperture 224 formed on a sampling cone 226, and the ionized sample 216 may be received into the instrument 220 through the sampling aperture 224. In this embodiment, a heat shield 230 is directly adjacent the sampling cone 226 such that the heat shield 230 is in contact with at least portion of the sampling cone 226. For example, the heat shield 230 may be formed as a coating layer on a portion of the sampling cone 226 such that the heat shield 230 and sampling cone 226 may define a single unitary structure. Alternatively, the heat shield 230 and sampling cone 226 may be provided as separate members that may be mechanically coupled to one another. As illustrated, the heat shield 230 may not be provided on an entirety of the sampling cone 226 such that an aperture 232 of the heat shield 230 may be larger than the sampling aperture 224.

Further, similar to the previously described system 100 of FIG. 1, the analysis system 200 may further include a pump 240 associated with the chamber 202 to extract heated gas and/or plasma 218 from the chamber 202. Additionally, one or more insulating members 250 may be positioned with chamber 202, such as around a perimeter of the chamber 202.

Figure 3:
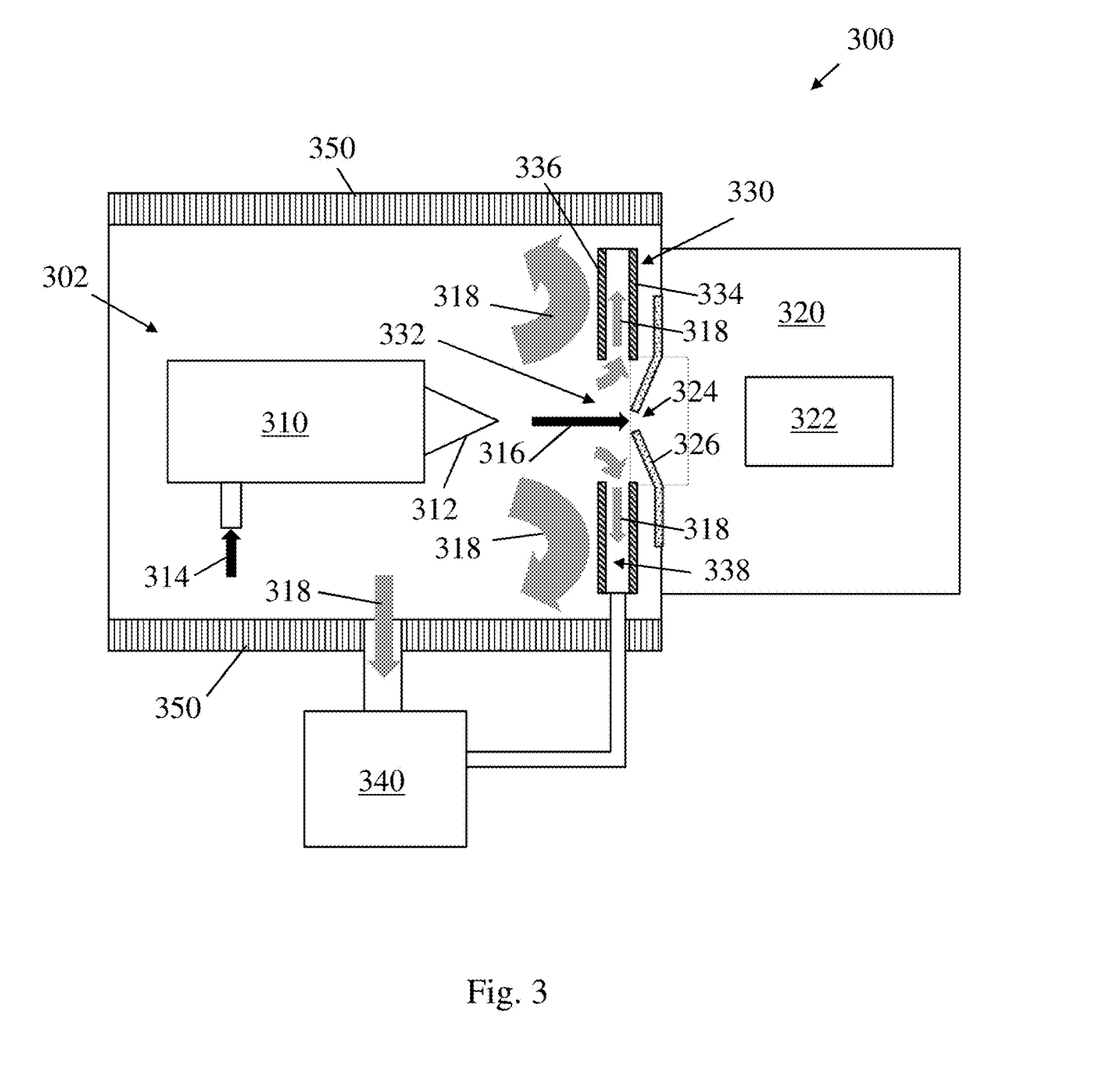
FIG. 3 is a schematic cross-sectional view of an analysis system, according to some embodiments.

FIG. 3 depicts a schematic cross-sectional side view of a further embodiment of an analysis system 300. Similar to the embodiments discussed above in connection with FIGS. 1-2, the system 300 includes a plasma source 310 positioned within a chamber 302 to generate a plasma 312 to ionize a sample 314 introduced into the plasma source, thereby forming an ionized sample 316. The ionized sample 316 may be analyzed by an instrument 320, such as an MS or OES instrument, using one or more sensors or sensor assemblies 322 associated with the instrument. As illustrated, the instrument includes a sampling aperture 324 formed on a sampling cone 326, and the ionized sample 316 may be received into the instrument 320 through the sampling aperture 324.

In this embodiment, a heat shield 330 includes a first heat shield layer 334 and a second heat shield layer 336 spaced from the first heat shield layer 334 to define a conduit 338 between the first and second heat shield layers. In this manner, heated gas and or plasma 318 that enters an aperture 332 of the heat shield 330 may be extracted from the system 300 through the conduit 338. For example, the conduit may be coupled to a pump 340 configured to extract the heated gas and/or plasma 318 from the conduit 318. Further, similar to the embodiments described above, the heat shield 330 may be constructed and arranged to direct the heated gas and/or plasma 318 away from the system 300, and in some instances, the pump 340 may be further configured to extract heated gas and/or plasma 318 from the chamber 302. By using the same pump 340 to extract gas and/or plasma 318 from the chamber 302 and extract heated gas and/or plasma 318 from the conduit 318, thermal management may be improved without adding additional expensive components such as an additional pump. Moreover, in some instances, the system may include one or more insulating members 350 positioned around a perimeter of the chamber 302, such as along side walls of the chamber 302 and/or at an interface between the chamber and the instrument 320.

Figure 4:
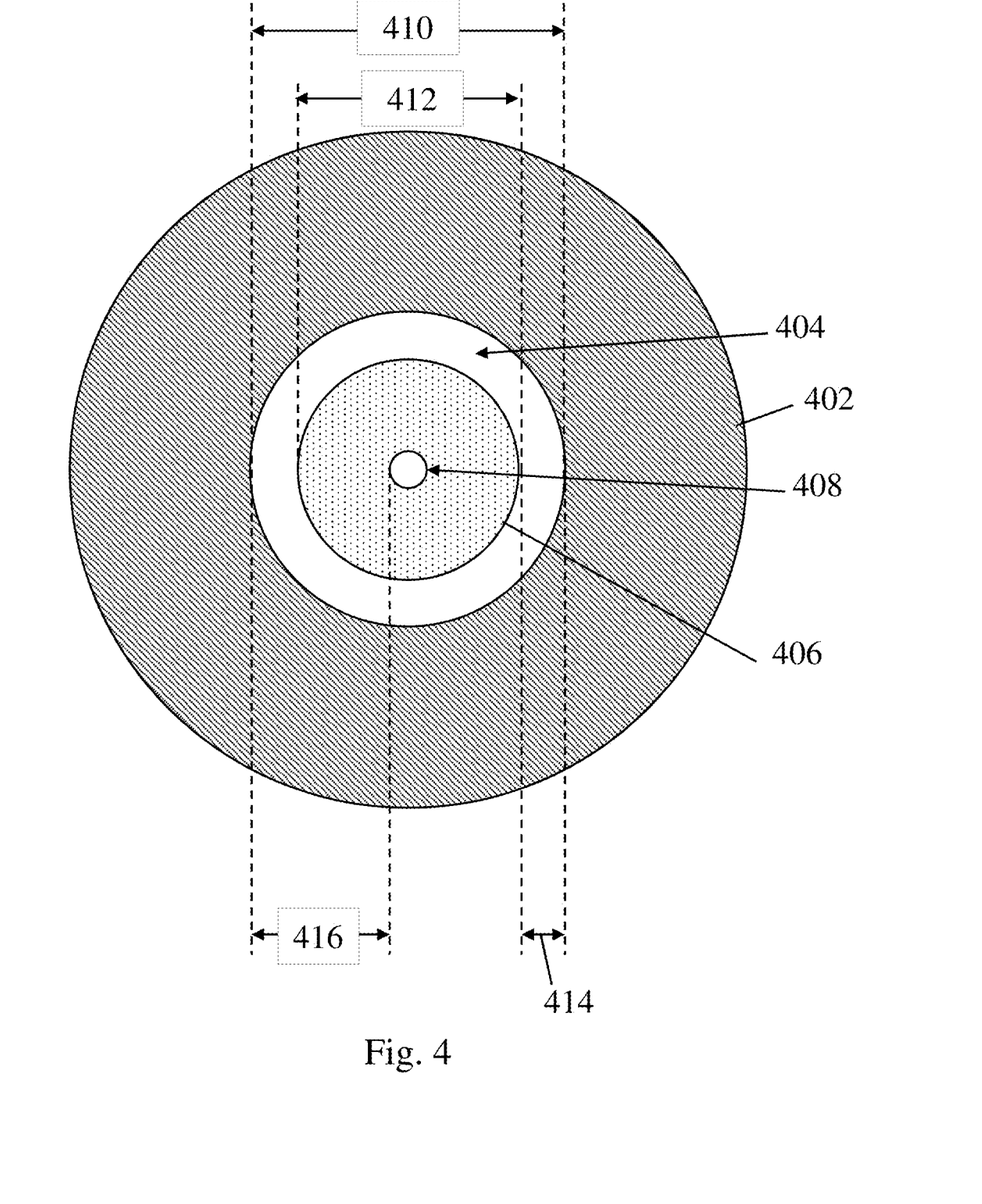
FIG. 4 is a schematic representation of a portion of an analysis system, according to some embodiments.

Referring now to FIG. 4, one embodiment of a heat shield and sampling cone are described in more detail. In particular, FIG. 4 depicts a heat shield 402 including an aperture 404, as well as a sampling cone 406 in which a sampling aperture 408 is formed. In the depicted embodiment, the aperture 404 has a diameter 410 that is larger than a diameter 412 of the sampling cone. In this manner, a first spacing 414 may be provided between the aperture 404 and the sampling cone 406. In some instances, this first spacing (which may be defined along a radial direction and referred to as a radial spacing) may allow for removal of the sampling cone 406 through the aperture 404 of the heat shield 402 without requiring removal of the heat shield 402. However, as discussed previously, a heat shield may at least partially overlie a sampling cone in some embodiments such that there is no radial spacing between the sampling cone 406 and the heat shield 402. Accordingly, it should be understood that the current disclosure is not limited to arrangements in which an aperture of the heat shield is larger than a sampling cone.

As further illustrated in FIG. 4, the sampling aperture 408 and the heat shield aperture 404 may be constructed and arranged so at to define a second spacing 416 between an edge of the sampling aperture 408 and an edge of the heat shield aperture. For example, as discussed above, this second spacing 416 may be selected such that the heat shield 402 is not exposed to the highest temperatures that may generally be present at a central portion of a plasma generated by a plasma source.

Figure 5:
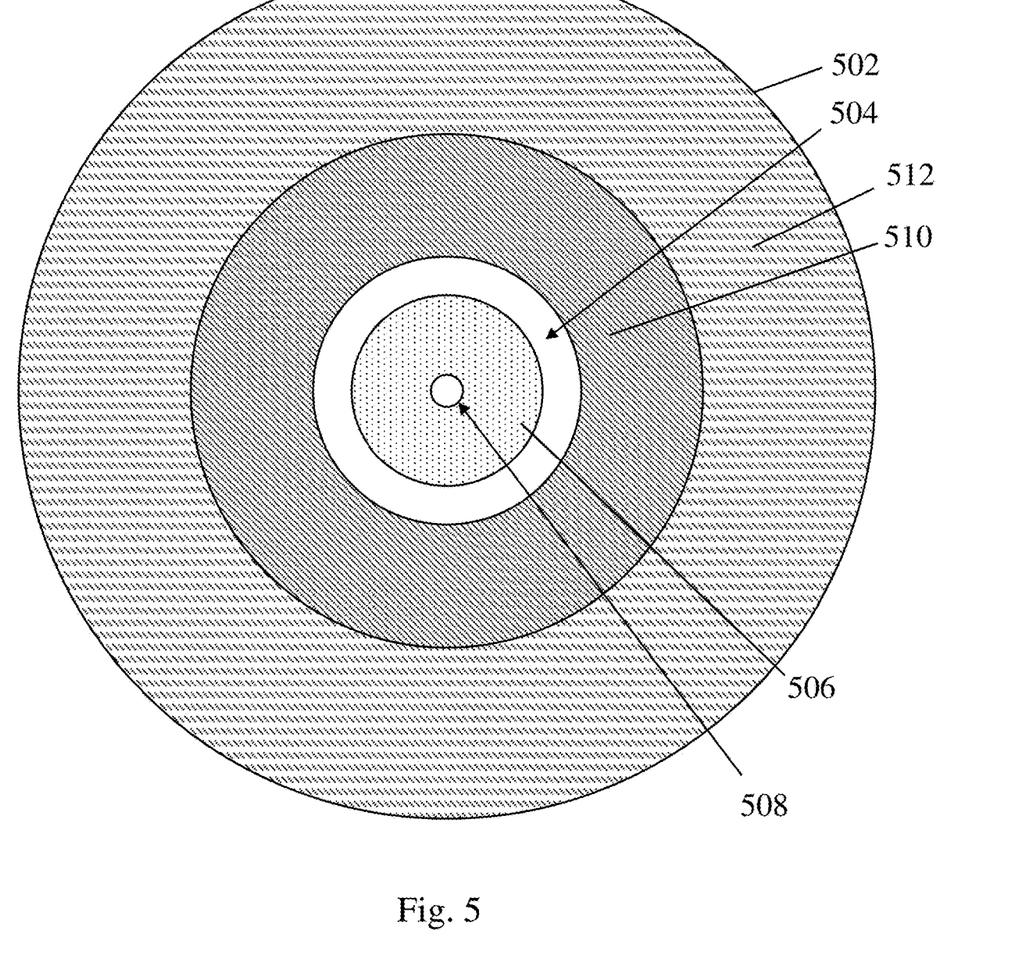
FIG. 5 is a schematic representation of a portion of an analysis system, according to some embodiments.

FIG. 5 depicts a further embodiment of a heat shield and sampling cone arrangement. Similar to the previously described embodiment of FIG. 4, FIG. 5 depicts a heat shield 502 including an aperture 504, as well as a sampling cone 506 in which a sampling aperture 508 is formed. In this embodiment, the heat shield is formed in a modular fashion. In particular, the heat shield 502 includes a first heat shield portion 510 positioned closer to the sampling aperture 508 than a second heat shield portion 512. For example, such an arrangement may allow for one or more of the heat shield portions 510 and 512 to be removable. For instance, the first heat shield portion 510 may be exposed to higher temperatures than the second heat shield portion 512 due to its proximity to a central portion of a plasma generated by a plasma source, and thus the first portion 510 may require replacement more frequently than the second portion 512. Alternatively or additionally, in some instances, the first and second portions may be formed from different materials. For example, the first portion 510 may be formed of a higher grade high temperature material relative to the second portion 512 such that the first portion has a higher maximum operational temperature than the second portions. Such arrangements may allow for high grade materials to be used only in portions of the heat shield that are closest to the center to the plasma and are exposed to the highest temperatures, while other lower grade (and potentially lower cost materials) may be used for portions of the heat shield that are exposed to lower temperatures.

The heat shield as shown in the example embodiments of FIGS. 4 and 5 may have a thickness suitable for any particular use. For examples, in some embodiments, a thickness of the heat shield may be between about 0.5 mm and about 5 mm, between about 1 mm and about 4 mm, and/or between about 2 mm and about 3 mm. The thickness may be uniform or non-uniform. As shown in FIG. 5, heat shield portion 510 may have a different thickness, larger or smaller, than that of heat shield portion 512.

While the heat shields, heat shield apertures, sampling cones, and sampling apertures are generally depicted as having a circular shape in FIGS. 4-5, it should be appreciated that other shapes, such as rectangular shapes, ellipsoidal shapes, and/or irregular shapes may be suitable for one or more of these features. Moreover, the heat shields and/or sampling cones (or other features of an instrument on which a sampling aperture is formed) may have a three-dimensional shape (e.g., a partially conical shape) and/or may be substantially planar. Accordingly, the current disclosure is not limited to any particular shape(s) for these features.

Figure 6:
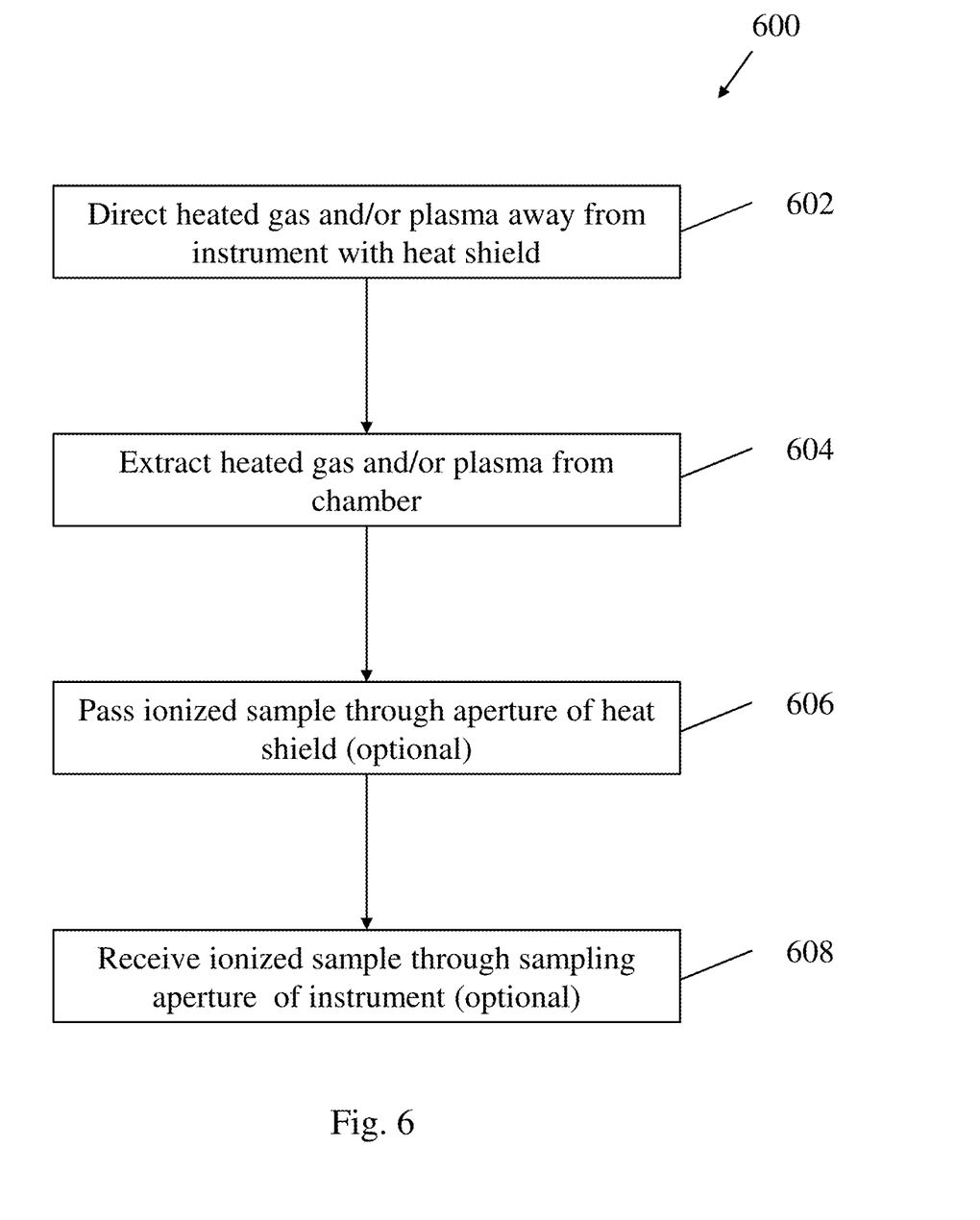
FIG. 6 is a flow chart depicting a method of cooling an analysis system, according to some embodiments.

Referring now to FIG. 6, a method for operating an analysis system is described in more detail. FIG. 6 is a flow chart depicting one embodiment of a method 600 for operating an analysis system. The method begins at step 602, where heated gas and/or plasma generated by a plasma source is directed away from an instrument (such as an MS or OES analysis instrument). The heated gas and/or plasma may be directed away from the instrument via a heat shield positioned within a chamber between the plasma source and the instrument. The method then proceeds to step 604 where the heated gas and/or plasma is extracted from the chamber.

In some embodiments, method 600 may optionally proceed to step 606, where an ionized sample (e.g., a sample that was previously ionized by passing through the plasma source) is passed through an aperture of the heat shield. Additionally or alternatively, the method may optionally proceed to step 608 where the ionized sample is received through a sampling aperture of an instrument, e.g., for subsequent analysis by the instrument.

EXAMPLE

In one example, a series of experiments was performed to measure the temperature near a sampling aperture of an ICP-MS system using three different configurations. In the first configuration, the plasma was exposed directly to the sampling cone, with no heat shield in place. In the second configuration, a ceramic heat shield was placed between the ICP source and the sampling cone. In the third configuration, insulating members were added around the perimeter of the ICP chamber in addition to utilizing a ceramic heat shield between the ICP source and the sampling cone. For each configuration, the temperature after exposure to the plasma from the ICP source was measured using a temperature probe positioned approximately 3 inches from the sampling aperture on the sampling cone. The results for the three experimental configurations are summarized in Table 1 below, which demonstrate a substantial reduction in the measured temperatures for the second and third configurations that include the heat shield and the insulating members, respectively.

TABLE 1

| Experimental Configuration | Measured Temperature |
| --- | --- |
| No Heat Shield | 120° C. |
| With Ceramic Heat Shield | 91° C. |
| With Ceramic Heat Shield and Insulating Members | 82° C. |

Having thus described several aspects of at least one embodiment of the present invention, it is to be appreciated that various alterations, modifications, and improvements will readily occur to those skilled in the art. Such alterations, modifications, and improvements are intended to be part of this application and are intended to be within the spirit and scope of the present invention. Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Further, though advantages of some embodiments are indicated, it should be appreciated that not every embodiment will include every described advantage. Some embodiments may not implement any features described as advantageous herein. Accordingly, the foregoing description and drawings are by way of example only.

Use of ordinal terms such as "first," "second," "third," etc., in the claims to modify a claim element does not by itself connote any priority, precedence, or order of one claim element over another, but are used merely as labels to distinguish one claim element having a certain name from another element having a same name (but for use of the ordinal term) to distinguish the claim elements.

The indefinite articles "a" and "an," as used herein in the specification and in the claims, unless clearly indicated to the contrary, should be understood to mean "at least one."

The phrase "and/or" as used herein in the specification and in the claims, should be understood to mean "either or both" of the elements so conjoined, i.e., elements that are conjunctively present in some cases and disjunctively present in other cases.

What is claimed is:

1. An analysis system comprising:
   a plasma source configured to receive and ionize a sample to create an ionized sample;
   an instrument configured to receive the ionized sample to be analyzed, and including a sampling cone; and
   a heat shield positioned between and separate from the plasma source and the sampling cone of the instrument, wherein the heat shield is constructed from a heat insulating material and arranged to direct heated gas and/or plasma from the plasma source away from the instrument.

2. The analysis system of claim 1, wherein the plasma source is an inductively coupled plasma source.

3. The analysis system of claim 1, wherein the instrument comprises a mass spectrometer or an optical emission spectrometer.

4. The analysis system of claim 1, wherein the heat shield comprises an aperture sized and shaped to permit the ionized sample to pass through the heat shield to the instrument.

5. The analysis system of claim 4, wherein the instrument comprises a sampling aperture constructed and arranged to receive the ionized sample.

6. The analysis system of claim 5, wherein the aperture of the heat shield is larger than the sampling aperture.

7. The analysis system of claim 5, wherein the sampling aperture is formed on the sampling cone of the instrument.

8. The analysis system of claim 5, wherein the heat shield comprises a first heat shield portion and a second heat shield portion, wherein the first heat shield portion is positioned closer to the sampling aperture than the second heat shield portion.

9. The analysis system of claim 8, wherein the first and second heat shield portions are formed from different materials.

10. The analysis system of claim 4, wherein the heat shield has a non-uniform thickness.

11. The analysis system of claim 1, wherein the heat shield comprises a first heat shield layer and a second heat shield layer spaced from the first heat shield layer.

12. The analysis system of claim 11, wherein a gap between the first and second heat shield layers defines a conduit through which the heated gas and/or plasma is extracted.

13. The analysis system of claim 12, wherein the conduit is coupled to a pump configured to extract the heated gas and/or plasma.

14. The analysis system of claim 1, wherein the heat shield comprises a ceramic material, a metallic material, a silicon-based material, and/or a carbon-based material.

15. The analysis system of claim 14, wherein the heat shield comprises a ceramic material, and wherein the ceramic material is at least one selected from the group consisting of an oxide, a carbide, and a nitride.

16. The analysis system of claim 1, further comprising one or more insulating members positioned around at least a portion of a perimeter of a chamber in which the plasma source is positioned.

17. The analysis system of claim 16, wherein a material of the one or more insulating members is different than a material of the heat shield.

18. The analysis system of claim 1 wherein the heat shield directs heated gas and/or plasma away from the instrument without liquid or gas cooling of the sampling cone.

19. A method of cooling an analysis system, the method comprising:
   directing heated gas and/or plasma away from an instrument with a heat shield constructed from a heat insulating material separate from and positioned in a chamber between a plasma source and a sampling cone of the instrument; and
   extracting at least a portion of the heated gas and/or plasma from the chamber.

20. The method of cooling of claim 19 wherein the heated gas and/or plasma directing is performed without liquid or gas cooling of the sampling cone.

* * * * *